United States Patent [19]

Bader et al.

[11] 4,376,284

[45] Mar. 8, 1983

[54] INK JET PRINT HEAD

[76] Inventors: Leonhard Bader, Pferseer Str. 5, 8901 Stadtbergen; Frank Giessner, Ulrichsplatz 13; Helmut Weber, Ramsbergstr. 10, both of 8900 Augsburg, all of Fed. Rep. of Germany

[21] Appl. No.: 341,811

[22] Filed: Jan. 22, 1982

Related U.S. Application Data

[63] Continuation of Ser. No. 140,065, Apr. 14, 1980, abandoned, which is a continuation of Ser. No. 969,904, Dec. 15, 1978, abandoned.

[30] Foreign Application Priority Data

Feb. 27, 1978 [DE] Fed. Rep. of Germany ....... 2808275

[51] Int. Cl.[3] ............................................ G01D 15/18

[52] U.S. Cl. ................................................ 346/140 R

[58] Field of Search .................................... 346/140 R

[56] References Cited

U.S. PATENT DOCUMENTS

| | | | |
|---|---|---|---|
| 3,708,798 | 1/1973 | Hildenbrand | 346/140 |
| 3,747,120 | 7/1973 | Stemme | 346/140 X |
| 3,869,986 | 3/1975 | Hubbard | 346/140 X |
| 4,095,237 | 6/1978 | Amberntsson | 346/140 |
| 4,124,853 | 11/1978 | Kattner | 346/140 |
| 4,158,847 | 6/1979 | Heinzl | 346/140 |

*Primary Examiner*—Joseph W. Hartary

*Attorney, Agent, or Firm*—J. T. Cavender; Wilbert Hawk, Jr.; George J. Muckenthaler

[57] ABSTRACT

An ink jet print head has a plurality of nozzles arranged in a vertical line at the printing end and connected by respective ink channels to pressure cavities in a circular arrangement at the ink supply end. The pressure cavities are supplied from an intermediate chamber contained in the print head and formed in a thin elongated shape and positioned generally in a plane parallel with the line of the nozzles. The construction of the print head compensates for acceleration and deceleration forces which are induced in the ink due to movement of the print head in the horizontal direction or perpendicular to the plane of the nozzles.

3 Claims, 3 Drawing Figures

INK JET PRINT HEAD

This application is a continuation of application Ser. No. 140,065, filed Apr. 14, 1980, which is a continuation of appln. Ser. No. 969,904, filed Dec. 15, 1978 now abandoned.

BACKGROUND OF THE INVENTION

In the field of ink jet printing, a common construction of the print head has included a plurality of ink drive elements and a plurality of associated nozzles to form a multiple nozzle print head. Additionally, certain printing devices comprise a plurality of single nozzle print heads wherein a drive element and an associated nozzle of simple unitary construction form each of the print heads which are spaced in a line across the printer and thereby print lines of dots in the process of printing the characters along a line thereof.

In the case of a multiple nozzle print head, such head usually assumes a frustum-like shape wherein a plurality of nozzles at the small end of the head are closely positioned in a vertical line for ejecting droplets of ink against a record medium for forming the characters. A plurality of drive elements are associated with the respective nozzles by means of fluid passageways or conduits and wherein the drive elements are arranged in circular manner at the large end of the print head.

In any event, the print head is caused to travel in back-and-forth or reciprocating manner across the printer and in a direction which is transverse or perpendicular to the direction of movementof the record medium to be printed. The droplets of ink are caused to be ejected through the nozzles by means of individual membranes controlled by drive elements in the form of piezoelectric crystals which are actuated to increase the pressure in the ink cavity and force the droplets of ink against the record medium.

When the print head is caused to be moved at high speeds back-and-forth across the printer, the head and the ink in the channels and passageways are subjected to extreme acceleration and deceleration forces at the ends of the line of printing and the flow of ink may be interrupted while being subject to these forces during the printing operation. The quality of printing and the reliablity of operation or functioning of the ink jet printer or recording device considerably and substantially depends on the ability of the print head to resist the effects of these acceleration and deceleration forces.

Representative prior art in ink jet printers includes German Pat. No. 2,262,106, (see U.S. Pat. No. 3,708,798) wherein a multiple nozzle ink jet print head includes an intermediate container through which the ink flows from the ink supply container to the print head nozzles. The intermediate container includes an air bubble wherein fluctuations of pressure and pressure shocks occurring in the supply system are absorbed to a certain degree and the reliability of functioning of the print head is improved.

German Pat. No. 2,543,397 (see U.S. Pat. No. 4,124,853) discloses damping means for compensating fluctuations of pressure in ink supply systems of printing devices. The damping means consists of a membrane which is arranged at the uppermost part of the common ink distributing means of the print head.

SUMMARY OF THE INVENTION

The present invention relates to ink jet recording devices, and more particularly, to the construction of a print head having a plurality of drive elements for causing ink to be forced through passageways and ejected through a plurality of associated nozzles as droplets of ink onto an adjacent record medium. The print head includes an intermediate container formed and positioned within the print head to serve as an initiating point of supply for the ink channels and to compensate for fluctuations in the ink supply and also to resist the effect of acceleration and deceleration forces in the ink due to movement of the print head in a side-to-side operation.

The print head has a plurality of closely-spaced nozzles formed in a vertical line at the small end of the frustum-like shaped head and connected with respective channels or passageways running through the print head which are in turn connected with pressure cavities arranged in circular manner at the large end of the print head. The pressure cavities are supplied with ink from an intermediate container which is formed in a thin elongated manner and positioned near the large end of the print head and extending in a plane corresponding to the vertical line of the nozzles. The ink supply from the intermediate container to the pressure cavities is carried in radial passageways or conduits which extend perpendicular to the plane of the ink nozzles and which intermediate container lies perpendicular to the direction of movement of the print head in printing operation.

The position of the ink supply inlets and outlets from the supply container through the intermediate container and to the ink droplet drive elements is structured to function in a manner and arrangement to provide compensation for the acceleration and deceleration forces which are derived or caused from the high speed of travel of the print head and the reversal thereof at the ends of the lines of printing.

In view of the above discussion, the principal object of the present invention is to provide an ink jet recording device in an arrangement to maintain even flow of ink to the multiple nozzles of the device.

Another object of the present invention is to provide intermediate means in an ink jet recording device for distributing the ink from a supply thereof in controlled manner to the ink nozzles of the recording device.

An additional object of the present invention is to provide a multiple nozzle ink jet print head having a path of ink flow therethrough to compensate for undesirable forces acting on the ink from movement of the print head.

A further object of the present invention is to provide an ink jet print head having a plurality of nozzles and an ink supply with an intermediate container for carrying the flow of ink in a path positioned in relation to the nozzles so as to compensate for acceleration and deceleration forces acting on the flow of ink as a result of movement of the print head in transverse direction.

Additional advantages and features of the present invention will become apparent and fully understood from a reading of the following description taken together with the annexed drawing.

DESCRIPTION OF THE PREFERRED EMBODIMENT

The illustrated multiple nozzle ink jet print head, according to the present invention, can be used in all of the known printing devices where print heads are secured on carriages which are movable back-and-forth in line printing direction across the record medium to be printed. The nozzles lying opposite the record medium to be printed usually are arranged in a spaced, straight line manner which is transverse to the direction of movement of the print head so that by individual selection of respective drive elements associated with the nozzles, upon print head movement in the line of printing direction transverse to the direction of movement of the record medium to be printed, any of the desired alpha-numeric characters can be printed on the record medium.

Figure 1:
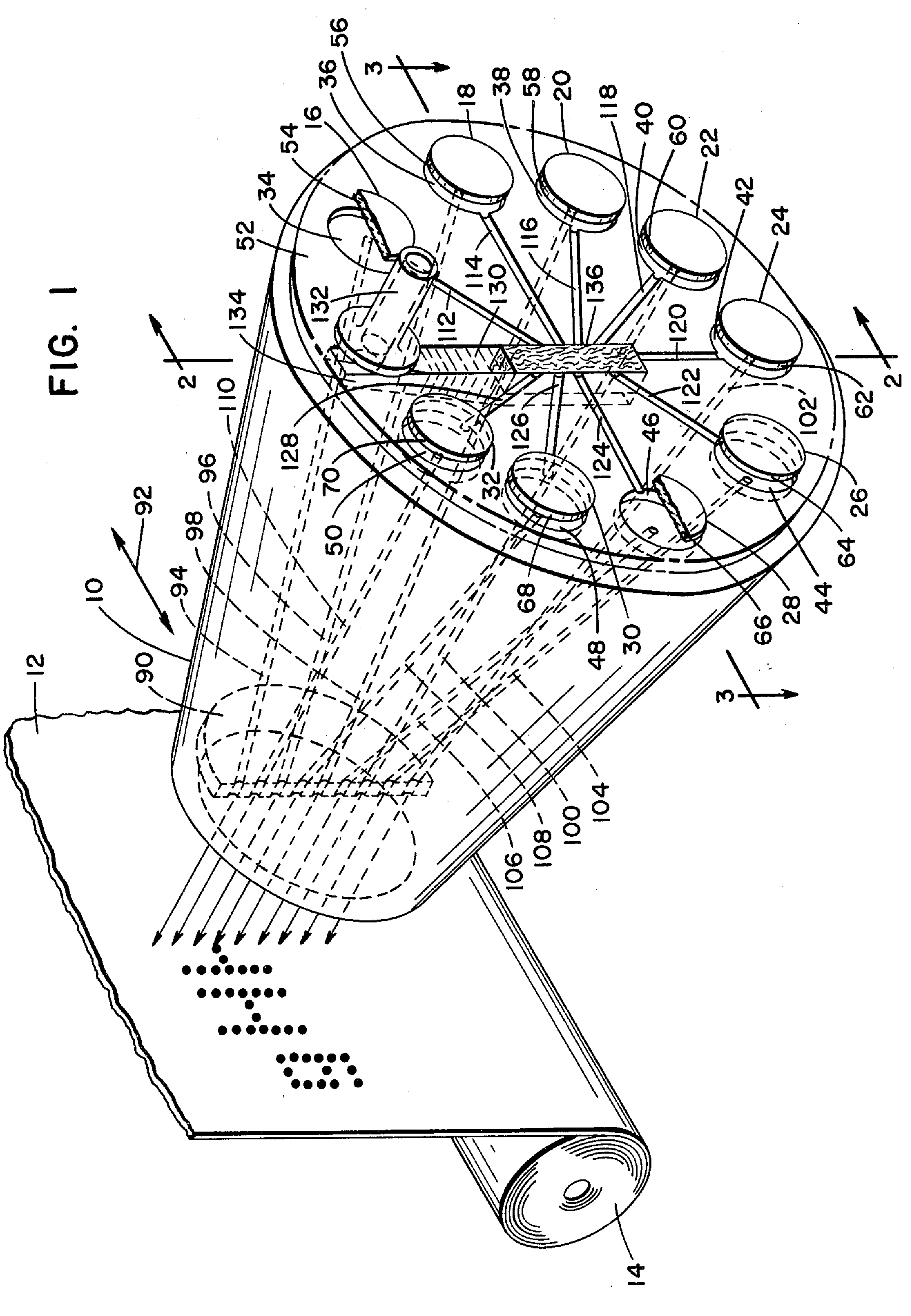
FIG. 1 is a perspective view of an ink jet print head according to the present invention.

Referring to the drawing, FIG. 1 shows a multiple nozzle ink jet print head 10 in perspective view, the shape of the print head being generally in the form of a trapezoid so that upon the arrangement of the print head in a printing device, the record medium to be printed will not be masked by the end of the print head which is opposite the record medium. While other shapes of print heads are within the scope of the present invention, the preferred print head 10 can be cast in a suitable casting mold of plastic material whereby during the casting process, the various cavities and passageways for the individual elements and the ink are produced in the print head. A suitable mold used in the method for making an ink jet print head is described in the application filed by applicants on the same day as the present invention and assigned to the same assignee.

The print head 10 shown in FIG. 1 may be installed in a conventional printing device and positioned on a carriage in well-known manner so that the smaller end surface of the formed print head lies opposite a record medium 12 to be printed. The record medium 12 can in usual manner originate from a supply roll 14 and be transported past the face of the print head 10 so that through the movement of the print head in a line printing direction, which is transverse to the transport direction of the record medium, the desired information can be printed upon the record medium.

Figure 2:
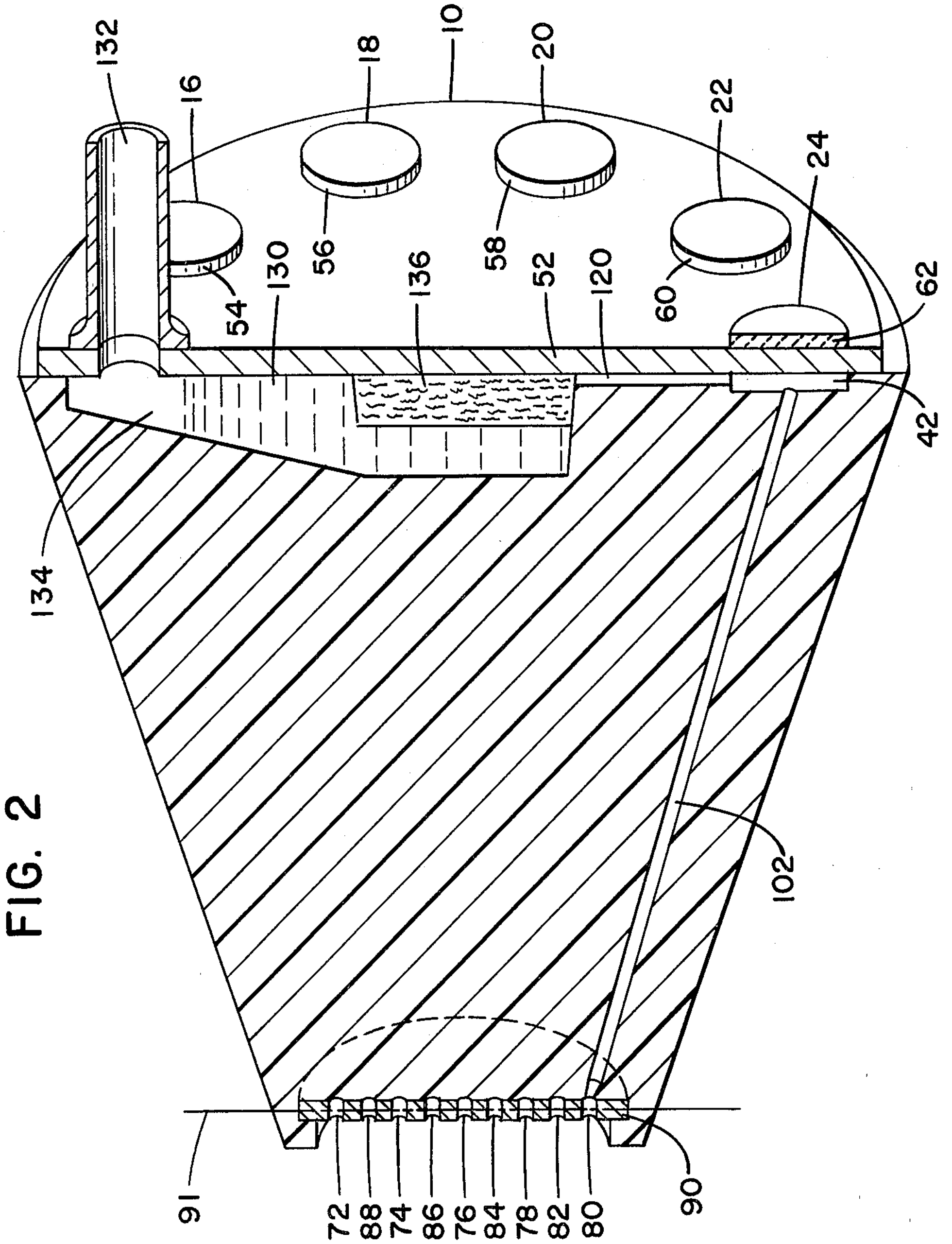
FIG. 2 is a sectional view taken along the line 2—2 of FIG. 1.
Figure 3:
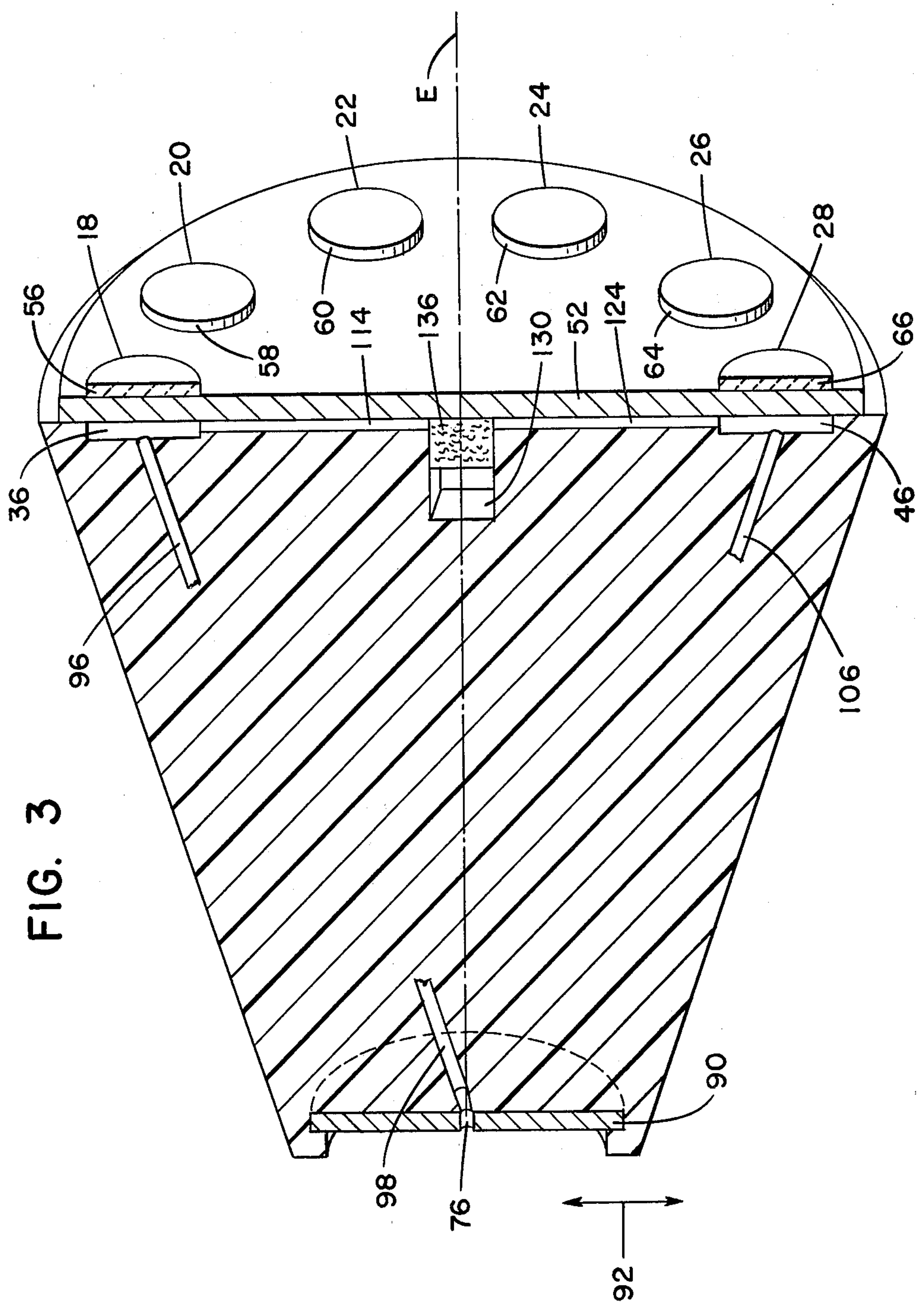
FIG. 3 is a sectional view taken along the line 3—3 of FIG. 1.

A plurality of nine circularly arranged printing elements 16, 18, 20, 22, 24, 26, 28, 30 and 32 are located at the opposite or larger end surface of the print head 10, with the exterior of the print elements (as shown in FIGS. 2 and 3) projecting outwardly from the surface of the print head. The nine printing elements 16 through 32 consist of nine capillary pressure cavities 34, 36, 38, 40, 42, 44, 46, 48 and 50, with the cavities being circularly arranged in the cast plastic body of the print head 10. The nine capillary pressure cavities 34 through 50 are hermetically sealed by a common membrane 52 covering the entire larger end surface of the print head 10 and over which individual capillary pressure cavities there are arranged drive elements in the form of nine electrically controllable piezoelectric crystals 54, 56, 58, 60, 62, 64, 66, 68 and 70, which crystals are carried and supported by the membrane 52.

The smaller end surface of the print head 10 includes a plurality of nine nozzles 72, 74, 76, 78, 80, 82, 84, 86 and 88 provided in a nozzle plate 90 cast in the print head and positioned opposite the capillary pressure cavities. The nine nozzles 72 through 88 are arranged in a spaced manner along a vertical line 91, FIG. 2, which line extends transverse or at right angles to the direction of movement of the print head 10, as shown by the double arrow 92 in FIGS. 1 and 3. Through electrical control of the individual piezo crystals 54 through 70, the droplets of ink are ejected from the nozzles 72 through 88 and form print patterns on the record medium 12 which is caused to be driven in a path opposite the nozzles. The nozzles 72 through 88 are connected with the nine respectively-associated capillary pressure cavities 34 through 50 by means of nine nozzle channels 94, 96, 98, 100, 102, 104, 106, 108, and 110.

The ink supply for the nine capillary pressure cavities 34 through 50 respectively is caused to be transported through separate ink supply channels 112, 114, 116, 118, 120, 122, 124, 126 and 128, with feeding points of such ink supply channels originating from a chamber 130 positioned in the print head 10 and located centrally with respect to the printing elements 16 through 32. The chamber 130 serves as an intermediate container and is partially filled with ink for distribution to the respective printing elements 16–32. The ink supply to the internal chamber 130 occurs in advantageous manner through an external supply line 132 into the upper part of such chamber 130 which has an air bubble 134 (FIG. 2) included therein. It is a matter of course that all of the channels 112 through 128 are filled with ink and the level of liquid ink in the chamber 130 is to be chosen so that it is above the upper feeding or distributing points of the channels. The chamber 130 includes as a part thereof a filter portion 136 which may be of sintered metal material for capturing dirt particles and preventing same from entering into the ink supply channels 112 through 128.

The present invention is based on an ink jet print head of compact construction, as seen in FIG. 1, where the individual printing elements 16 through 32 are circularly arranged and are laterally displaced relative to the nozzles 72 through 88 which are located along the line 91, as seen in FIG. 2. The lateral displacement is necessary since the drive elements always require a larger surface area than the nozzles, with the lateral displacement being especially great in the case of print heads as presently disclosed having circularly arranged drive elements 54–70 and nozzles 72–88 lying along the line 91.

The above arrangement has the advantage in that the ink supply to the individual capillary pressure cavities 34 through 50 occurs outgoing or radially from the center of the print head 10 and the central supply of ink within the intermediate ink chamber 130 is advantageous to provide for a compact print head which eliminates the effects of acceleration and deceleration at the ends of the print lines.

When the print head 10 is caused to be rapidly driven in the direction of the arrow 92 (FIG. 1), acceleration and deceleration forces occur in the nine nozzle channels 94 through 110. These forces of acceleration and deceleration, upon reversal of the direction of movement of the print head, are sufficiently high to have an effect on the operation of the print head and in some instances cause air bubbles to be drawn in through the ink nozzles 72 through 88. It is also known that the magnitude of the forces acting in the individual nozzle channels 94 through 110 in the outward direction of the channels is quite different. For example, in the embodiment of FIG. 1, the forces occurring in channels 96 and 106 (right and left of center) in the outward direction of such channels is of the highest value, while that force in channel 102 (downwardly of center) is of the lowest value.

The forces of different strength or value acting in the nine nozzle channels 94 through 110 can be compensated by reason that the feeding points of the nine individual ink supply channels 112 through 128 originate and are placed in a central or mid-location which is along a plane E (FIG. 3) and which extends through the nozzle vertical line 91 and is transverse to the direction of movement (arrow 92) of the print head 10. The principle of the present invention is such that upon the positioning of the inner or chamber 130 interconnecting ends of the individual ink supply channels 112 through 128 along the plane E, there are brought about compensating forces in the ink. The unbalanced forces in the ink are caused by the accelerated movement of the print head 10 in the direction of the arrow 92 (which is transverse to the plane E), and by reason of the location and positioning of the ink supply conduits, there occurs in each of the nine nozzle channels 94 through 110 and in the nine ink supply channels 112 through 128 forces of sufficiently high intensity which operate together to provide equal pressures with each other in paired manner by compensating action in the nine associated pressure cavities 34 through 50.

Such compensation principle of the present invention is generally known in physics as the "principle of the communicating tubes", and the individual acceleration forces acting in the nozzle channels 94 through 110 and in the supply channels 112 through 128, respectively, and the compensation forces therefor can be calculated by use of trigonometric functions.

In the embodiment described herein, the feeding points (the inner ends) of the nine ink supply channels 112 through 128 from the chamber 130 (FIG. 1) are not exactly positioned on the plane E (FIG. 3) since the dimension of the chamber in a direction of movement of the print head 10 (arrow 92) must have a certain physical size. However, the thinner the chamber 130 in the direction of the arrow 92, the more complete is the compensating effect for the forces of acceleration and deceleration. The space for the liquid ink required in the chamber 130 for each of the ink supply channels 112 through 128 can be appropriately enlarged or increased by means of deepening the chamber 130 toward the smaller end surface of the print head 10, i.e. in the direction of the nozzles 72 through 88, and by adjusting the length of the chamber 130 in a direction transverse to the direction of the arrow 92, i.e., in the direction of the nozzle vertical line 91 between the supply line 132 and the printing element 24, as seen in FIG. 2.

As already stated, the extension of the chamber 130 in FIGS. 1, 2 and 3 between the common ink supply 132 and the printing element 24 is not critical since in such element 24 or, respectively, in the nozzle channel 102 and the ink supply channel 120, there does not occur an acceleration force acting in the direction of the nozzle channel 102 and the supply channel 120 upon a movement of the print head 10 in the direction of the arrow 92. It is seen that only upon a deviation of the channel direction from a right angle relative to the direction of movement 92 of the print head 10 that acceleration forces occur in the channels which are then compensated by the appropriate inventive location and path of the ink supply channels and the arrangement of the feeding points at or along the plane E.

A comparison of FIGS. 2 and 3 shows that the compensation of the acceleration forces in the channels becomes better for a smaller width of the chamber 130, and taken in the direction of movement 92 of the print head 10. As discussed previously, additional space for the chamber 130 can be provided by an appropriate elongation of the chamber dimension between the supply 132 and the element 24 and by deepening of the chamber toward the inside of the print head. As is apparent from FIG. 3, if the chamber 130 is thinner, the feeding or originating points of the nine ink supply channels 112 through 128 are closer to the plane E and the compensating effect is greatly improved. It is also seen that the compensating effect is always independent of the angle between a nozzle channel and its associated ink supply channel. The nozzle channel 102 for the printing element 24 and the associated ink supply channel 120, as seen in FIGS. 1 and 2, are right angle guided or transverse to the direction of movement 92 of the print head 10 so that accelerations acting in channel direction can neither occur in the nozzle channel nor in the ink supply channel.

Through the herein disclosed positioning of the nine ink supply channels 112–128 in a plane extending transverse to the direction of movement of the print head 10 and through the line 91 of the nozzles 72–88, the print head becomes more resistant to acceleration and deceleration forces since any such forces occurring in the respective ink channels produce pressures compensating each other in the associated capillary pressure cavity.

It is thus seen that herein shown and described is an ink jet print head which includes ink supply lines or channels having distributing points which are located in a plane at right angles or transverse to the direction of movement of the print head during operation thereof and which arrangement of lines provides compensation for forces caused by high values of acceleration and deceleration. The print head of the present invention enables the accomplishment of the objects and advantages mentioned above, and while a preferred embodiment has been disclosed herein, variations thereof may occur to those skilled in the art. For example, a narrow intermediate chamber or a tubular member can be provided as a common supply or distributing conduit for the capillary pressure cavities wherein the feeding point for such cavities originates directly on the plane which extends through the line of nozzles and is transverse to the direction of movement of the print head. It is contemplated that all such variations and modifications not departing from the spirit and scope of the invention hereof are to be construed in accordance with the following claims.

What is claimed is:

1. An ink jet print head movable in a direction along a line of printing and comprising a plurality of ink drive elements positioned in a circular and substantially planar arrangement at one end of said print head, a plurality of ink nozzles positioned in alignment at the other end of said print head, conduit means connecting said drive elements and said ink nozzles for flow of ink therethrough, and ink supply means at said one end of said print head including an elongated ink container centrally positioned at said one end in a plane generally perpendicular to the direction of movement of said print head and disposed in a plane with ink supply lines extending in planar manner radially in a direction from said elongated container to said ink drive elements and substantially parallel with said line of printing for supplying ink from said container to said drive elements and having end portions of said ink supply lines originating from the elongated plane of said ink container, whereby the acceleration effect on the ink in said conduit means and in the lines of said ink supply means by reason of high pressure resulting from movement of said print head in a lateral direction is compensated so that said drive elements provide an even flow of ink to said nozzles.

2. In an ink jet printer having an ink jet print head movable in a lateral direction thereacross, ink supply means for supplying ink to ink nozzles aligned at one end of said print head for ejecting droplets of ink onto a record medium, said ink supply means comprising a plurality of ink drive elements positioned in planar spaced circular manner at the other end of said print head, a plurality of passageways connecting said ink drive elements with respective ink nozzles, an elongated ink holding member centrally disposed at said other end of said print head adjacent said drive elements and positioned in a plane generally perpendicular to the direction of movement of said print head for receiving ink and for distributing ink to said ink drive elements, and a plurality of ink carrying lines connected with the sides of said ink holding member and extending in said planar manner radially in a direction from said elongated member and in a plane substantially parallel with the direction of movement of said print head and connected with respective ink drive elements, said ink holding member being disposed in the plane of said ink carrying lines whereby the one ends of said ink carrying lines are thus also positioned generally along a plane perpendicular to the direction of movement of said print head to minimize the effect of print head movement on the flow of ink to said nozzles.

3. Apparatus for supplying ink in continuous manner through an ink jet print head and to a plurality of ink nozzles at one end thereof disposed in vertical direction along a line of printing, means for moving said print head in back-and-forth direction along said line of printing, a plurality of ink drive elements disposed in planar circular manner at the other end of said print head opposite said ink nozzles, a plurality of passageways connected with said ink drive elements and with respective ink nozzles, an elongated ink supply member centrally positioned at said other end of said print head adjacent said ink drive elements and in a plane generally perpendicular to the direction of movement of said print head for receiving ink and for distributing ink to said ink drive elements, and ink supply lines connected with said ink supply member and extending in said planar manner radially in a direction from said elongated member and in a plane substantially parallel with the direction of movement of said print head and connected with said ink drive elements, said ink supply member being disposed in the plane of said ink supply lines, the one ends of said ink supply lines entering within said ink supply member so as to be likewise positioned along a plane perpendicular to the direction of movement of said print head.

* * * * *

UNITED STATES PATENT AND TRADEMARK OFFICE

CERTIFICATE OF CORRECTION

PATENT NO. : 4,376,284

DATED : March 8, 1983

INVENTOR(S) : Leonhard Bader, Frank Giessner & Helmut Weber

It is certified that error appears in the above—identified patent and that said Letters Patent is hereby corrected as shown below:

Title page, column 1, after the list of inventors, insert the following:

-- [73] Assignee: NCR Corporation, Dayton, Ohio --.

Signed and Sealed this

*Twenty-sixth* Day of *July 1983*.

[SEAL]

*Attest:*

GERALD J. MOSSINGHOFF

*Attesting Officer* *Commissioner of Patents and Trademarks*